United States Patent [19]
Inaba et al.

[11] Patent Number: 5,225,122
[45] Date of Patent: Jul. 6, 1993

[54] METHOD FOR TAKING COUNTERMEASURES AGAINST FAULTY MOLDING IN AN INJECTION MOLDING MACHINE

[75] Inventors: Yoshiharu Inaba, Kawasaki; Masao Kamiguchi, Oshino; Takayuki Taira, Hachioji; Hiroshi Watanabe, Minato, all of Japan

[73] Assignee: Fanuc Ltd, Minamitsuru, Japan

[21] Appl. No.: 730,848

[22] PCT Filed: Nov. 21, 1990

[86] PCT No.: PCT/JP90/01519

§ 371 Date: Aug. 29, 1991

§ 102(e) Date: Aug. 29, 1991

[87] PCT Pub. No.: WO91/08097

PCT Pub. Date: Jun. 13, 1991

[30] Foreign Application Priority Data

Nov. 24, 1989 [JP] Japan .................. 1-303253

[51] Int. Cl.$^5$ ............................. B29C 45/76
[52] U.S. Cl. .................. 264/40.1; 425/135; 425/161; 364/476
[58] Field of Search ........... 264/40.1, 40.3, 40.4, 264/40.5, 40.6, 328.1; 425/135, 140, 141, 143, 144, 145, 149, 161, 162, 169, 170, 173, 542; 395/900; 364/476

[56] References Cited

U.S. PATENT DOCUMENTS

| | | | |
|---|---|---|---|
| 4,816,197 | 3/1989 | Nunn | 264/40.1 |
| 4,849,143 | 7/1989 | Langecker | 264/40.1 |
| 4,911,629 | 3/1990 | Fujita | 264/40.1 |
| 5,062,785 | 11/1991 | Stroud, III et al. | 264/40.5 |

FOREIGN PATENT DOCUMENTS

| | | |
|---|---|---|
| 62-249722 | 10/1987 | Japan . |
| 63-209917 | 8/1988 | Japan . |
| 1-24719 | 1/1989 | Japan . |
| 2-165928 | 6/1990 | Japan . |

Primary Examiner—Jill L. Heitbrink
Attorney, Agent, or Firm—Staas & Halsey

[57] ABSTRACT

A method for taking countermeasures against faulty molding in which, with the aid of an expert system, restoration to a nondefective molding condition when faulty molding takes place during the mass production of molded products. When threshold values of a plurality of molding parameters, and information indicative of countermeasure processes, respectively corresponding to combinations of evaluations on these parameters and determined on the basis of the knowledge and experiences of skilled persons, are manually entered through a data input device (119), they are stored in tables of a memory (110) beforehand under the control of a processor (114). Upon start of the mass production, the injection time, metering time and cushion amount which are measured or calculated during a molding cycle, and the resin pressures corresponding to the manually set screw positions at the time of passing the gate and filling are set in the tables as reference values of the parameters. Upon occurrence of faulty molding, the processor makes an evaluation on each parameter by comparing the deviation between each parameter value in the molding cycle accompanied with the faulty molding and its reference value with threshold values, and changes desired ones of parameter values forming the molding condition, in accordance with a countermeasure process that has been read from the tables in dependence on results of the evaluations.

6 Claims, 3 Drawing Sheets

METHOD FOR TAKING COUNTERMEASURES AGAINST FAULTY MOLDING IN AN INJECTION MOLDING MACHINE

BACKGROUND OF THE INVENTION

1. Field of the Invention

The present invention relates to a method for taking countermeasures against faulty molding in an injection molding machine, and more particularly, to a method which makes restoration to a nondefective molding condition, with the aid of an expert system, when faulty molding takes place during the mass production of molded products.

2. Description of the Related Art

A molding condition for carrying out an injection molding cycle includes a large number of molding parameters such as injection pressure, injection time, etc. Thus, in order to establish an optimum molding condition, optimum values of various molding parameters must be determined. The optimum molding condition also varies in dependence on the type of products. For these reasons, the optimum molding condition is generally determined in a trial-and-error manner by repeating an operation of carrying out an injection molding cycle in accordance with a tentative molding condition, and then changing the molding condition in accordance with the type of faulty molding found in the resultant molded product. Therefore, proper and quick setting of an optimum molding condition requires a skilled person having various knowledge and experiences. In this respect, an expert system, which enables an unskilled person to set the optimum molding condition, has been recently developed. The expert system, which comprises programs and a database prepared beforehand on the basis of the knowledge and experiences of skilled persons, is arranged to effect an optimum molding condition setting process on an interactive basis with an operator.

Once an optimum molding condition is established as described above, an injection molding machine repeats the injection molding cycle in accordance with the optimum molding condition thus established, to perform the mass production of molded products. During this time, in general, the injection molding cycle is implemented repeatedly under the same optimum molding condition, without changing the molding condition. Nevertheless, defective moldings are produced occasionally. In this case, a diagnosis is conducted to identify the cause of the faulty molding, and the optimum molding condition is set again in accordance with results of the diagnosis. However, the mechanism of occurrence of faulty molding is complicated, and various molding parameters are involved therein. Also, there are various types of faulty molding such as burrs, sinks, etc. In addition, similar faulty molding is not necessarily caused by similar improper molding parameters. This means that, when faulty molding takes place, the knowledge and experiences of the skilled are required to determine which ones of the many molding parameters should be changed and how much they should be changed to make restoration to a normal molding condition.

Thus, it may be considered to use the expert system to make a restoration process when faulty molding occurs during the mass production of molded products just as it is used to establish an optimum molding condition prior to the start of the mass production. However, the conventional expert system is primarily designed from a viewpoint of enabling determination of a new optimum molding condition on the basis of various molding parameter values detected as the injection molding cycle is repeatedly tried, with molding parameter values changed, and data indicative of the conformity of molded products and entered by an operator during the repetitive molding. According to the conventional expert system, therefore, it is impossible to efficiently perform a restoration process which is required upon occurrence of faulty molding during the mass production of molded products conducted under the same optimum molding condition.

SUMMARY OF THE INVENTION

The object of the present invention is to provide a method for taking countermeasures against faulty molding in an injection molding machine, which is capable of properly and quickly making restoration to a nondefective molding condition, with the aid of an expert system, when faulty molding occurs during the mass production of molded products.

To achieve the above-mentioned object, according to the present invention, a method for taking countermeasures against faulty molding comprises the steps of: detecting values of a plurality of molding parameters during mass production of molded products; comparing that value of each molding parameter which is detected when faulty molding occurs with a preset reference value of each molding parameter, to make an evaluation on each molding parameter; and selectively performing that one of preset countermeasure processes against faulty molding which corresponds to a combination of the evaluations on the plurality of molding parameters.

Preferably, the reference values of the molding parameters are measured in advance during molding where nondefective products are molded. Also, at least one threshold value is set beforehand, which is associated with a deviation between each molding parameter value detected at the time of faulty molding and the reference value of each molding parameter, and the deviation of each molding parameter is compared with the associated threshold value, to make the evaluation on that parameter. The molding parameters, the threshold values each associated with a corresponding one of the molding parameters, and the countermeasure processes against faulty molding each associated with a corresponding one of combinations of evaluations on the molding parameters are selected or set beforehand on the basis of knowledge and experiences of skilled persons.

As described above, according to the present invention, the evaluation on each molding parameter is effected by comparing each molding parameter value, detected when faulty molding occurs during the mass production of molded products, with the preset reference value of each molding parameter, and that one of the preset countermeasure processes against faulty molding which corresponds to a combination of the evaluations on the plurality of molding parameters is selectively carried out. As a result, it possible to properly and quickly carry out restoration to a nondefective molding condition upon occurrence of the faulty molding.

Preferably, the molding parameters are selected beforehand based on the knowledge and experiences of the skilled persons. Also, the deviation between each molding parameter value detected upon occurrence of faulty molding and the reference value of each molding parameter preset during the nondefective molding is detected, and the evaluation on each molding parameter is effected by comparing the deviation with the threshold value preset based on the knowledge and experiences of the skilled persons. Further, in accordance with results of the evaluations on the molding parameters, a corresponding one of countermeasure processes against faulty molding which are preset based on the knowledge and experiences of the skilled persons is selectively carried out. As a result, restoration upon occurrence of faulty molding can be carried out in a manner as if such restoration were made by a skilled person, without intervention of the skilled person.

DESCRIPTION OF THE PREFERRED EMBODIMENTS

Figure 1:
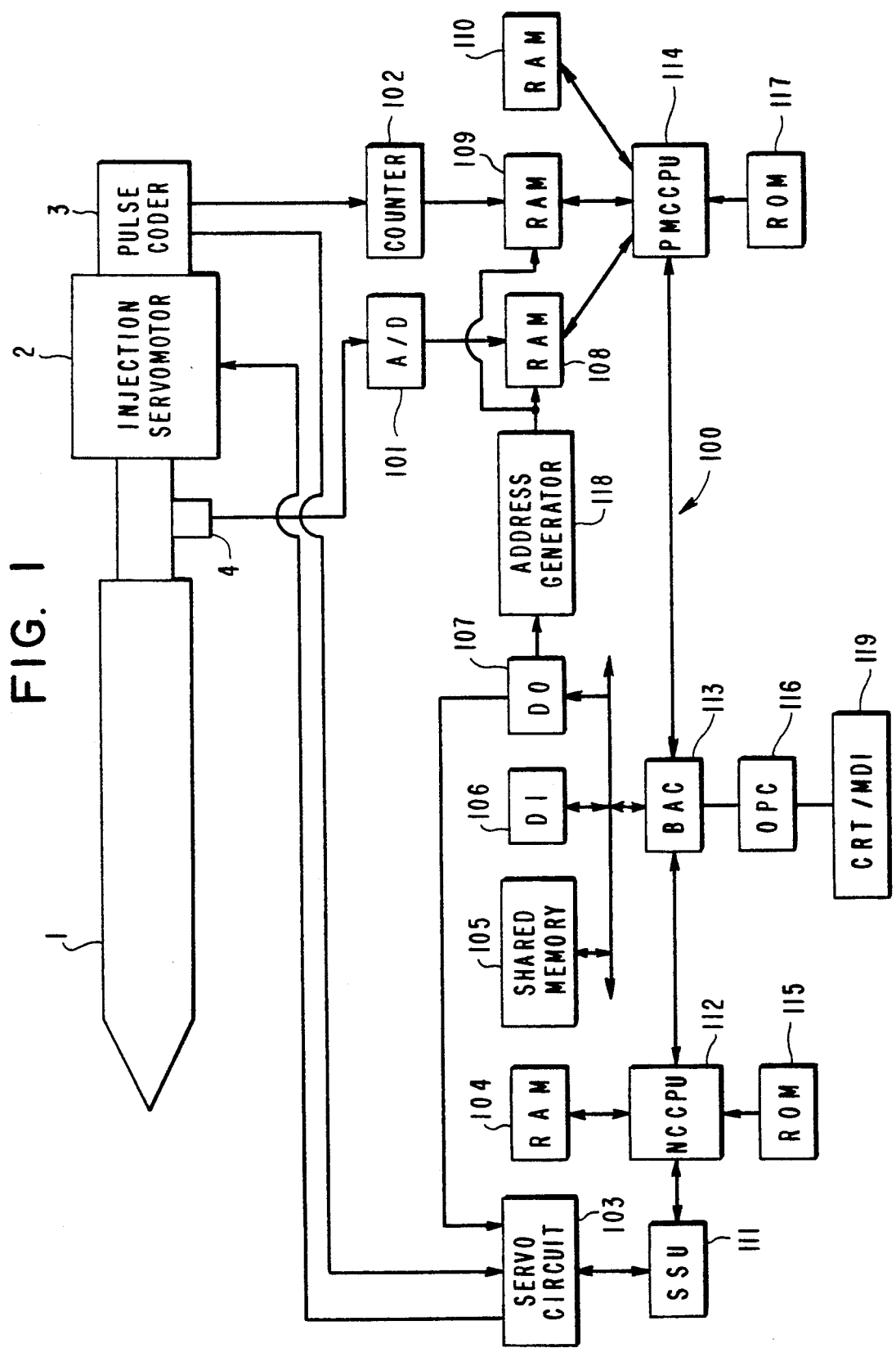
FIG. 1 is a block diagram showing an essential part of an injection molding machine for embodying a method, of an embodiment of the present invention, for taking countermeasures against faulty molding.

An injection molding machine for embodying a method of the present invention comprises various units such as an injection unit, a mold-clamping unit, etc. Referring to FIG. 1, the injection unit, which is provided with a screw 1 disposed in a heating cylinder, not shown, an injection servomotor 2 for driving the screw in the axial direction, and a servomotor (not shown) for rotating the screw 1, is so designed as to move the screw 1 axially, to thereby inject molding material (resin) plasticized and kneaded within the heating cylinder into a mold, not shown. The injection servomotor 2 is mounted with a pulse coder 3 for detecting the rotary position of the motor (axial movement position of the screw), and the screw 1 is mounted with a pressure sensor 4 for detecting a resin pressure (axial reaction force applied by the molten resin to the screw). Also, the injection molding machine is provided with a numerical control apparatus (hereinafter referred to as an NC apparatus) 100 which cooperates with a programmable machine controller (mentioned later) to control the various units of the injection molding machine.

The NC apparatus 100 comprises a numerical control microprocessor (hereinafter referred to as NCCPU) 112 for controlling the various servomotors through a servo interface 111 and various servo circuits (only the servo circuit for the injection servomotor 2 is indicated by reference numeral 103), and the respective servo circuits are connected with pulse coders (only the pulse coder for the injection servomotor 2 is denoted by reference numeral 3). A random-access memory (RAM) 104 for temporal data storage, etc., and a read-only memory (ROM) 115 storing therein a management program for controlling the whole injection molding machine are connected to the NCCPU 112.

The NC apparatus 100 is further provided with a microprocessor (hereinafter referred to as PMCCPU) 114 for the programmable machine controller, to which are connected a ROM 117 storing therein a sequence program for controlling the sequential operation of the injection molding machine, and a RAM 110 for temporal data storage, etc. The RAM 110 is designed to store the later-mentioned two tables T1 and T2 for the countermeasure process against faulty molding, mentioned later.

A bus arbiter controller 113 (hereinafter referred to as BAC) interposed between the CPUs 112 and 114 is connected with respective busses of a shared memory 105, an input circuit 106, and an output circuit 107, so that either one of the CPUs is selectively rendered to be accessible, under the control of the BAC 113, to a desired one of the elements 105 to 107 in each arithmetic operation cycle of the CPUs 112 and 114. The shared memory 105 which consists of a nonvolatile RAM has a program storage section for storing, e.g., NC programs for controlling the injection molding machine, and a setting section for storing various setting values, parameters and macro variables indicative of a molding condition.

The input circuit 106 is connected to, e.g., various sensors provided in the various units of the injection molding machine, while the output circuit 107 is connected to various servo circuits, including the servo circuit 103, and an address generator 118 which is in turn connected to two RAMs 108 and 109 accessible from the PMCCPU 114. The RAM 108, which is connected to an A/D converter 101 connected to the pressure, is designed to store an A/D converter output, indicative of a resin pressure, in an address area specified by an output signal supplied from the address generator 118. The RAM 109, connected to a counter 102 for adding up feedback pulses received from the pulse coder 3, is designed to store a counter output, indicative of a screw position, in an address area specified by an output from the address generator.

A manual data input device with a CRT display unit (hereinafter referred to as CRT/MDI) 119, which is connected to the BAC 113 through the operator panel controller 116, is provided with various keys, e.g., for entering data, and a CRT display controller which accommodates therein a pressure data RAM and a screw position data RAM for the later-mentioned graph display, these RAMs respectively corresponding to the RAMs 108 and 109.

As will be described in detail, the PMCCPU 114 is designed to compare the deviation between each molding parameter and its reference value with a threshold value concerned, to thereby make an evaluation on each parameter, and perform a required countermeasure process in accordance with a combination of evaluation results on the individual parameters when faulty molding takes place during the mass production of molded products. The types of molding parameters for evaluation, the threshold value of each parameter, and contents of the countermeasure processes are set appropriately on the basis of knowledge and experiences of skilled persons.

In the present embodiment, employed as molding parameters to be subject to evaluations are injection time, metering time, cushion amount, resin pressure at the time of passing a gate, and resin pressure at the time of filling. With regard to each of the parameters, a first threshold value $Ki1$ ($>0$), a second threshold value $Ki2$ ($<Ki1$, $>0$), a third threshold value $Ki3$ ($<0$), and a fourth threshold value $Ki4$ ($>Ki3$, $<0$) are used ($i=1$ to 5). Each parameter is subjected to 5-level evaluation of "2," "1," "0," "−1," and "−2" in accordance with the result of comparison between the deviation Δxi of each parameter value, obtained upon occurrence of faulty molding, from its reference value (xis) and the first to the fourth threshold value values Ki1 to Ki4.

More specifically, the evaluation on each parameter will be effected in the following way; if the parameter value given when faulty molding takes place deviates from its reference value considerably in the positive direction (Δxi ≧ Ki1), then the evaluation result will be "2," and if it deviates slightly in the positive direction (Ki1 > Δxi ≧ Ki2), then the evaluation result will be "1." If there is no substantial deviation (Ki2 > Δxi > −Ki3), then the evaluation result will be "0." On the other hand, if the parameter value slightly deviates from the reference value in the negative direction, then the evaluation result will be "−1," and if it deviates significantly in the negative direction (Δxi ≦ −Ki4), then the evaluation result will be "−2."

In the following, the operation of the injection molding machine with the above construction will be explained.

When an operator specifies, through the CRT/MDI 119, as the molding parameters to be subject to evaluations upon occurrence of faulty molding, injection time, measurement time, cushion amount, resin pressure at the time of passing a gate, and resin pressure at the time of filling, and then enters the threshold values of Ki1 to Ki4 for each molding parameter in a predetermined order, the input data is stored in the RAM 110 as the table T1 shown in Table 1 below. At the time of entering the data, however, the reference value xis of each parameter is not yet entered.

When the operator enters corrective procedures for individual evaluating combinations of the five molding parameters in the specified order, the input data is stored in the RAM 110, under the control of the PMCCPU 114, as the table T2 shown in Table 2 below. Namely, countermeasure processes against faulty molding, each of which is represented by a corresponding one of combinations of evaluation results on the five parameters, are set in the table T2. Table 2 shows only first to third countermeasure processes which respectively correspond to first to third evaluation combinations of "2, 0, 0, 0, 0," "2, 2, 0, 0, 0," and "2, 1, 0, 0, 0." Those combinations of evaluation results which are associated with faulty molding that cannot take place during the mass production of molded products, and countermeasure processes corresponding thereto are not set.

TABLE 1

| Parameter | Injection time | Metering time | Cushion amount | Gate pressure | Filling pressure |
|---|---|---|---|---|---|
| Reference value | x1s | x2s | x3s | x4s | x5s |
| Threshold value | K11 | K21 | K31 | K41 | K51 |
| | K12 | K22 | K32 | K42 | K52 |
| | −K13 | −K23 | −K33 | −K43 | −K53 |
| | −K14 | −K24 | −K34 | −K44 | −K54 |

TABLE 2

| Evaluation combination | Countermeasure process |
|---|---|
| 2, 0, 0, 0, 0 | First countermeasure process |
| 2, 2, 0, 0, 0 | Second countermeasure process |
| 2, 1, 0, 0, 0 | Third countermeasure process |
| . | . |
| . | . |
| . | . |

TABLE 2-continued

| Evaluation combination | Countermeasure process |
|---|---|
| . | . |
| . | . |

After completion of entry of data on the countermeasure processes against faulty molding, an optimum molding condition for effecting an injection molding cycle for mass production are determined in a conventional manner, and stored in the setting section of the shared RAM 105. Thereafter, in accordance with the sequence program stored in the ROM 117 and the NC program stored in the shared RAM 105, sequence control is performed by the PMCCPU 114, and servomotors for individual axes are drivingly controlled by the NCCPU 112, so that one injection molding cycle is carried out.

During the injection molding cycle, an analog output from the pressure sensor 4 indicative of a resin pressure applied to the screw 1 is converted into a digital signal by the A/D converter 101, and feedback pulses delivered from the pulse coder 3 with movement of the screw 1 are added up by the counter 102. The thus accumulated value represents a screw position. When the PMCCPU 114 reads an injection start command from the program while executing the injection molding cycle, it causes the address generator 118 to operate. Namely, upon start of an injection process, the address generator 118 begins delivery of an addressing output (sampling command) to the RAMs 108 and 109. This addressing output is updated for each sampling cycle until a hold process is completed. As a result, the injection/hold pressure and the screw position in each sampling cycle are stored in corresponding address regions of the RAMs 108 and 109.

Figure 2:
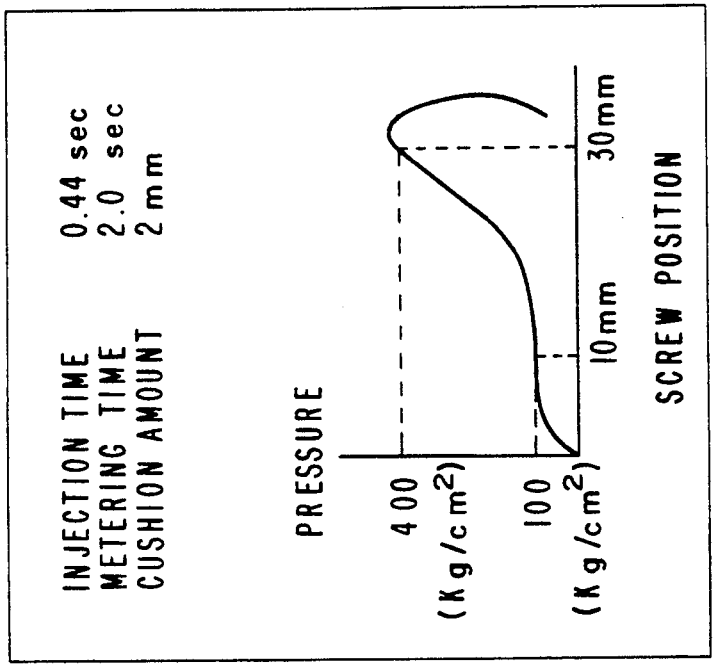
FIG. 2 is a view showing an example of measurement data display given during nondefective molding.

While the above-mentioned one injection molding cycle is being implemented, the PMCCPU 114 measures, by means of timers, an injection time from the start of the injection process to the moment the screw 1 reaches a hold starting position, a metering time from the start of a metering process to the moment the screw 1 reaches a metering point, etc., determines a cushion amount in accordance with a screw position at the time the hold process is completed, and stores the injection time, the metering time and the cushion amount in, e.g., the shared RAM 105. Under the control of the PMCCPU 114, the injection time, the metering time and the cushion amount are displayed by the CRT display controller on its CRT screen, as shown in FIG. 2. Further, under the control of the PMCCPU 114, a screw position vs. injection/hold pressure curve is graphically displayed on the CRT screen, as shown in FIG. 2, on the basis of the sampled data transferred from the RAMs 108 and 109 to the pressure data RAM and the screw position data RAM of the CRT display controller.

With reference to the screw position vs. injection/hold pressure curve and in consideration of the type of the mold used, the type of resin, the molding condition, etc., the operator sets the screw position (e.g. 10 mm) at the time the resin passes the gate, and the screw position (e.g. 30 mm) at the time of resin filling. In response to this, these two screw positions are stored in the shared RAM 105 under the control of the PMCCPU 114.

When the operator enters a continuous molding command through the CRT/MDI 119 after setting the screw positions at the time of passing the gate and at the time of filling, the PMCCPU 114 reads, from the shared RAM 105, the injection time, the metering time and the cushion amount in the above-mentioned one injection molding cycle, and then writes the thus read data, as reference values, in corresponding storage areas of the table T1. Further, the CPU 114 specifies those address regions of the RAM 109 in which the set screw positions at the time of gate passage and at the time of filling are stored, reads the sampled injection pressures at the time of gate passage and at the time of filling from the same address regions of the RAM 108, and writes, as the reference values, the thus read data into the storage areas of the table T1 respectively associated with pressures at the time of gate passage and filling.

Whereupon, the injection molding cycle is repeated in the same manner as in the above-mentioned one injection molding cycle, so as to carry out the mass production of molded products. Generally, the molding condition is not changed during the mass production. Nevertheless, defective products are occasionally produced.

Figure 3:
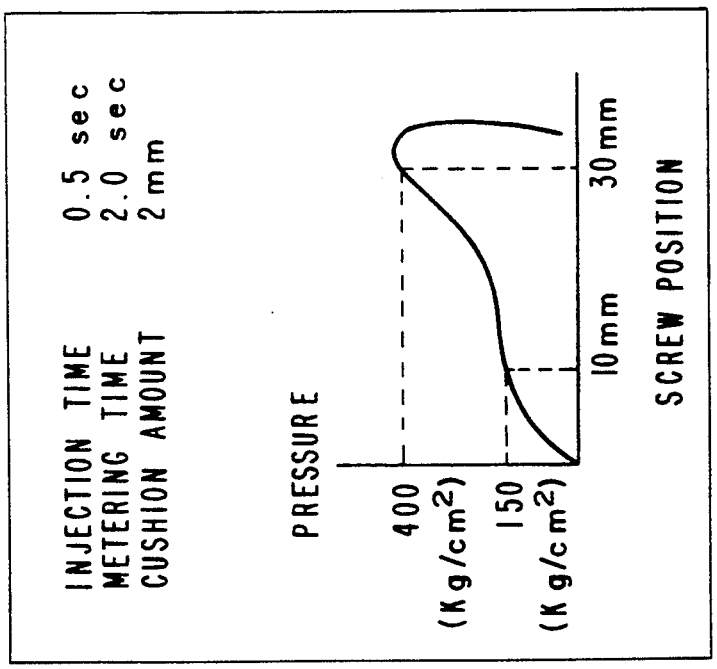
FIG. 3 is a view showing an example of measurement data display given during faulty molding.

Upon occurrence of faulty molding, the operator enters, through the CRT/MDI 119, a countermeasure command against faulty molding. In response to this, the PMCCPU 114 begins the countermeasure process against faulty molding shown in FIG. 4. In the meantime, FIG. 3 shows a display example of the injection time, the metering time, the cushion amount and the screw position vs. injection/hold pressure curve in an injection molding cycle which has developed faulty molding.

Figure 4:
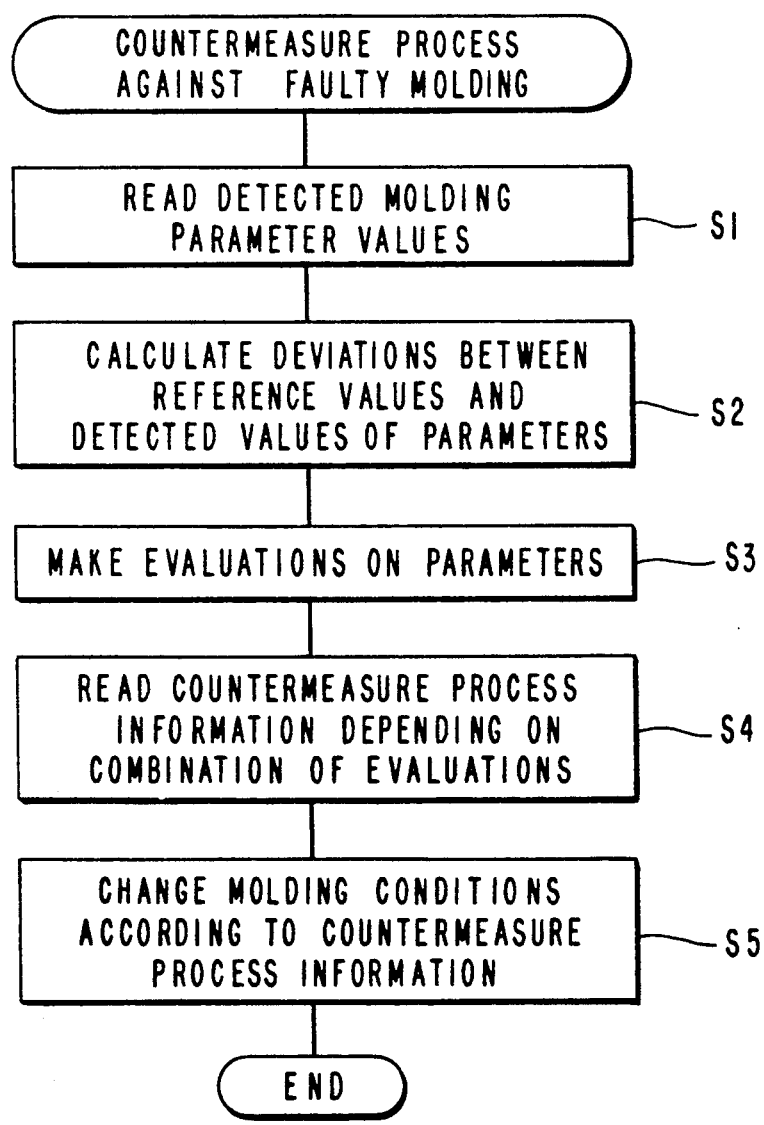
FIG. 4 is a flowchart showing a countermeasure process against faulty molding carried out by the injection molding machine shown in FIG. 1.

In the process shown in FIG. 4, the PMCCPU 114 reads, from the timers, the injection time x1 and the metering time x2 in the injection molding cycle where the faulty molding occurs, determines the cushion amount x3 based on the screw position at the time the hold process is completed, and reads, from the RAM 108, the pressure x4 at the time of gate passage and the pressure x5 at the time of filling (step S1). Then, the CPU 114 reads the reference values x1s to x5s of the parameters from the table T1, and calculates the deviations $\Delta x1$ to $\Delta x5$ between the measured values x1 to x5 of the parameters and their corresponding reference values x1s to x5s (step S2).

Whereupon, the PMCCPU 114 reads, from the table T1, the first to fourth threshold values Ki1, Ki2, $-$Ki3 and $-$Ki4 (i=1 to 5) respectively associated with the molding parameters to be subjected to evaluations, and compares the deviation $\Delta xi$ of each parameter with each of the four threshold values of the parameter, thereby making an evaluation on that parameter (step S3). The evaluation result will be "2" if $\Delta xi \geq Ki1$, or "1" if $Ki1 < \Delta xi \geq Ki2$, or "0" if $Ki2 < \Delta xi < -Ki3$, or "$-1$" if $-Ki3 \geq \Delta x1 < -Ki4$, or "$-2$" if $\Delta Xi \leq -Ki4$.

Next, the PMCCPU 114 determines a pattern indicative of the combination of the evaluations on the five molding parameters. As shown in FIG. 3, if the injection time x1 (=0.44 seconds) in the molding cycle accompanied with faulty molding is smaller than the reference value x1s (=0.5 seconds) by 0.06 seconds, the pressure at the time of passing the gate x4 (=100 kg/cm$^2$) is smaller than the reference value x4s (=150 kg/cm$^2$) by 50 kg/cm$^2$, and the remaining second, third and fifth parameter values are nearly equal to or show small deviations from the reference values, then the evaluation results on the first to fifth parameters are respectively denoted as "$-1$," "0," "0," "$-2$," and "0," for instance. Namely, the combination of evaluations in this case is represented by a pattern "$-1, 0, 0, -2, 0$."

Then, the PMCCPU 114 retrieves, from the table T2, a pattern that matches the pattern indicative of the combination of the evaluations and determined as described above, and reads from the table T2 that information on the countermeasure process which corresponds to the retrieved pattern, e.g., the information "Lower the nozzle temperature by 2 degrees" which corresponds to the pattern "$-1, 0, 0, -2, 0$" (step S4). And the CPU 114 changes the optimum molding condition in accordance with the countermeasure process information (step S5). For instance, in accordance with the countermeasure process information "Lower the nozzle temperature by 2 degrees," the CPU 114 sets a value, as the optimum nozzle temperature in the shared RAM 105, which is 2 degrees lower than the optimum nozzle temperature that has been set in the shared RAM 105 as one of the parameter values making up the optimum molding condition, in place of the previous optimum nozzle temperature.

When the molding condition is changed so that the countermeasure process against faulty molding shown in FIG. 4 is completed in this manner, the injection molding machine repeatedly carries out the injection molding cycle in accordance with the updated molding condition, thereby performing the mass production of molded products. If similar or different faulty molding still takes place after the molding condition is changed (if necessary, e.g., after elapse of a time period required for the nozzle temperature to rise), the operator enters the countermeasure command against faulty molding again, to cause the PMCCPU 114 to restart the countermeasure process against faulty molding.

The present invention is not limited to the foregoing embodiment, and various modifications thereof may be made.

For example, in the above-mentioned embodiment, only the information, indicative of the countermeasure process which must be taken upon occurrence of faulty molding, is stored in the table T2. Alternatively, a cause of such faulty molding may be also stored. In this case, preferably, the countermeasure process information and the cause of the faulty molding are displayed on the CRT screen.

Further, in the embodiment, the molding condition is automatically changed in accordance with the countermeasure process information retrieved from the table T2. Alternatively, the countermeasure process information may be displayed on the CRT screen, so as to urge the operator to change the molding condition. In this case, the NC apparatus waits until the operator completes the alteration of the molding condition.

Also, the countermeasure process information may be displayed on the CRT screen even when the molding condition is automatically changed. This will furnish the operator with a rough idea about when the alteration of the molding condition will be completed. This is especially convenient to a case where a certain time is required until an updated molding condition is actually attained, e.g., in a case where the nozzle temperature is changed.

We claim:

1. A method for taking countermeasures against faulty molding in an injection molding machine, comprising the steps of:
   (a) detecting values of a plurality of molding parameters during mass production of molded products;
   (b) comparing the value of each molding parameter which is detected when faulty molding occurs with a preset reference value of each molding parameter, to obtain a deviation for each molding parameter;

(c) comparing the deviation for each molding parameter, with at least one threshold value which has been respectively preset for each molding parameter, to obtain an evaluation combination for a set of molding parameters; and (d) obtaining a countermeasure against faulty molding from a table storing a plurality of countermeasures corresponding to each evaluation combination, based on the evaluation combination obtained in said step (c).

(e) changing a molding condition based on the evaluation combination determined in said step (c).

2. A method for taking countermeasures against faulty molding according to claim 1, wherein said preset reference value for each of the molding parameters is measured in advance of performing said steps (a)–(d), during molding where nondefective products are molded.

3. A method for taking countermeasures against faulty molding according to claim 1, further comprising the step of:

(f) presetting at least one threshold value associated with a deviation between each molding parameter value detected at a time of faulty molding and said reference value of said each molding parameter.

4. A method for taking countermeasures against faulty molding according to claim 3, wherein said plurality of molding parameters, said at least one threshold value associated with said each molding parameter, and said countermeasure processes against faulty molding each associated with a corresponding evaluation combination, are preset in advance of performing said steps (a)–(d), based on knowledge and experiences of skilled persons.

5. A method for taking countermeasures against faulty molding according to claim 1, wherein information is displayed, which represents the countermeasure obtained in said step (d).

6. A method for taking countermeasures against faulty molding according to claim 1, wherein said plurality of molding parameters include an injection time, a metering time, a cushion amount, a pressure at the time of passing a gate, and a pressure at the time of filling.

* * * * *

UNITED STATES PATENT AND TRADEMARK OFFICE
CERTIFICATE OF CORRECTION

PATENT NO. : 5,225,122
DATED : July 6, 1993
INVENTOR(S) : Yoshiharu INABA et al.

It is certified that error appears in the above-indentified patent and that said Letters Patent is hereby corrected as shown below:

```
Column 9, line 10, delete "and";

line 16, change "." (period) to

--; and-- (semi-colon).
```

Signed and Sealed this

Twenty-fourth Day of May, 1994

Attest:

BRUCE LEHMAN

Attesting Officer    Commissioner of Patents and Trademarks